United States Patent [19]
Feuling

[11] Patent Number: 5,421,301
[45] Date of Patent: Jun. 6, 1995

[54] DIRECT CYLINDER FUEL INJECTION SYSTEM FOR INTERNAL COMBUSTION ENGINES

[76] Inventor: James J. Feuling, 2521 Palma, Ventura, Calif. 93003

[21] Appl. No.: 194,735

[22] Filed: Feb. 14, 1994

[51] Int. Cl.$^6$ ............................................. F02B 3/00
[52] U.S. Cl. ................................................. 123/298
[58] Field of Search ....................... 123/298, 299, 300

[56] References Cited

U.S. PATENT DOCUMENTS

| | | | |
|---|---|---|---|
| 1,388,969 | 8/1921 | Peter | 123/298 |
| 2,058,487 | 10/1936 | Mock | 123/298 |
| 2,779,320 | 1/1957 | Goschel et al. | 123/298 |
| 2,800,118 | 7/1957 | Scherenberg | 123/298 |
| 2,988,067 | 6/1961 | Bottger | 123/298 |
| 4,318,377 | 3/1982 | Occella et al. | 123/298 |

*Primary Examiner*—Raymond A. Nelli
*Attorney, Agent, or Firm*—Frank D. Gilliam; John R. Duncan

[57] ABSTRACT

A system for introducing fuel into the combustion chamber of an internal combustion engine which includes at least one piston reciprocating in a cylinder with a cylinder head closing the top of the cylinder forming a combustion chamber between piston and head. At least one intake valve and one exhaust valve are provided in the cylinder head. One or more fuel injectors communicate through the sidewall of each of the engine cylinders for injecting fuel during the piston intake stroke while the top of the piston is below the injection site. The fuel injector may be any suitable injector, typically of a low pressure type. The fuel injector is oriented to direct a spray of fuel droplets in the direction of the cylinder head and/or the closed exhaust valve to speed droplet evaporation and cool the exhaust valve. Engines using this system also have increased tolerance of low octane fuel and improved emission characteristics.

14 Claims, 2 Drawing Sheets

DIRECT CYLINDER FUEL INJECTION SYSTEM FOR INTERNAL COMBUSTION ENGINES

BACKGROUND OF THE INVENTION

This invention relates in general to improvements in internal combustion engines and, more specifically, to a system for directly injecting fuel into an engine cylinder through the cylinder sidewall.

Over the years, a great deal of research and development effort has been expended toward achieving improved fuel efficiency together with reduced exhaust emissions in internal combustion engines. Higher compression ratios are usually beneficial in these areas. However, detonation rapidly becomes a problem unless high octane fuels or octane enhancing additives are used. High octane fuels are costly, and the enhancing additives often contribute to exhaust emission problems.

Many engine design and operational improvements have been made to allow higher efficiency with lower octane fuels. These include improvements in ignition control, in particular with computer controlled spark advance systems, improvements in valve timing, improved fuel delivery systems, in particular fuel injection systems, and combustion chamber design enhancements.

Significant advancements have been made in combustion chamber design, such as are described in my co-pending U.S. patent application, Ser. No. 07/995,785, filed Dec. 23, 1993.

Improvements in fuel delivery to these combustion chamber designs, or others, would further improve engine efficiency. Fuel injection systems in which fuel is indirectly injected as a spray either into a throttle body and ducted to the combustion chambers or into intake ports feeding combustion chambers are rapidly replacing carbureted systems. Under computer control, much more precise metering of fuel, improved fuel distribution and improved air delivery capacity, etc. are possible with fuel injection.

Single point injection systems where the fuel is injected into either the induction manifold of the throttle body suffer many of the problems generally associated with carburation. These include unequal mixture distribution to different cylinders and deposition of fuel on manifold walls. Multi-point port fuel injection provides a more even fuel distribution but raw fuel is still a problem on port walls and intake valves.

With direct fuel injection into the combustion chamber, the injector is ordinarily installed in the cylinder head, often at the top center of the combustion chamber to provide optimum fuel spray with minimal wall wetting. To avoid waste of fuel, valve arrangements must be designed to prevent fuel loss through the exhaust port during scavenging. Port or throttle body ;injection can utilize up to 720° of crankshaft rotation in a four-stroke engine. However, this sprays raw fuel onto the back of a closed intake valve resulting in liquid fuel on the port walls and valve and allows raw fuel to pass out of the exhaust port at overlap. This can also result in bore wall wetting, fouled spark plugs, worn piston rings, incomplete combustion, misfire, etc.

Direct injection into the combustion chamber directly from the cylinder head during the intake stroke has advantages over throttle body injection. However, these injectors tend to be high in cost due the necessity of resisting high chamber pressures and temperatures and often causes bore wall wetting resulting in excess piston ring wear, crankcase contamination and elevated hydrocarbon emissions.

A number of different arrangements for injecting fuel directly or indirectly into combustion chambers have been developed. Fuel may be injected into the side of the combustion chamber tangentially to cause a rich mixture to swirl past the spark plug. While effective in industrial power units running mainly at constant speed, difficulties in controlling swirl and stratification throughout the range and speeds of automobile engines and the like has limited the usefulness of this design. Other designs used a bowl-in-piston combustion chamber and an axial injector with either early or late injection, relative to the time the piston approaches top dead center. Maintaining an optimized stratified charge over a wide range of power loading has proven difficult.

Direct injection systems often have problems with depositions of fuel droplets on the cylinder walls followed by variable and incomplete evaporation, poor mixing of fuel and air that results in fuel/air separation problems. These produce cylinder to cylinder mixture uniformity problems.

There is a continuing need for improvements in the fuel injection system and its relationship to the combustion chamber to provide better atomization, lower exhaust emissions and an improved tolerance for lower octane fuel.

SUMMARY OF THE INVENTION

The above-noted problems are overcome, and advantages achieved, by a fuel injection system for internal combustion engines in which at least one injector is mounted in the sidewall of the cylinder so that fuel can be injected through an opening in the cylinder sidewall while the piston is in the intake stroke from about 40° after top dead center to approximately 80° before top dead center on the compression stroke, so that about 240° of crankshaft rotation is available. After the injection phase, the piston travels toward top dead center, covering the injector, and ignition occurs. For best results, the injector is orientated so as to direct the injected spray toward the closed exhaust valve. This both cools the exhaust valve and supplies heat to vaporize the spray, improving atomization.

The injector is not subjected to high temperatures or high pressure, simplifying injector design and allowing the use of a relatively low cost injector. Fouling of the injector is greatly reduced, since it is covered during actual combustion.

This arrangement provides improved combustion, resulting in lower exhaust emissions, higher fuel efficiency and an increased tolerance for lower octane fuels. There is no overlap flow or crossflow of hydrocarbons.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
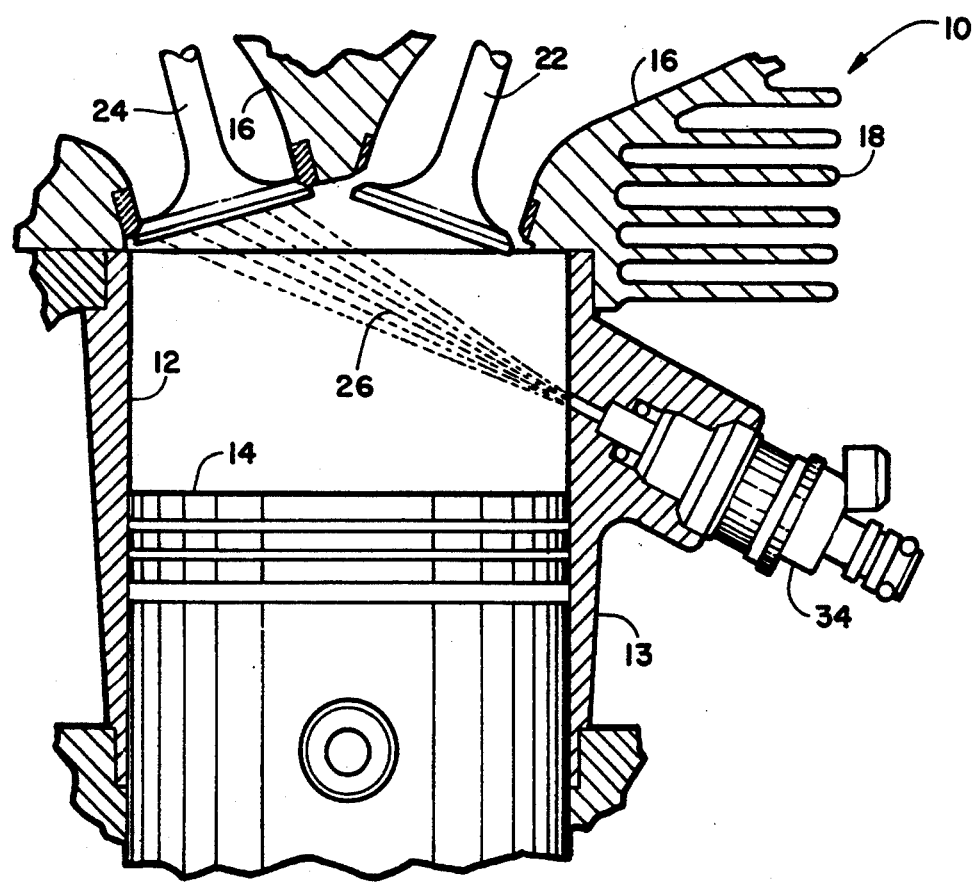
FIG. 1 is a schematic transverse vertical section view through one cylinder of an engine using the fuel injection system of this invention on the cylinder side opposite the exhaust valve.
Figure 2:
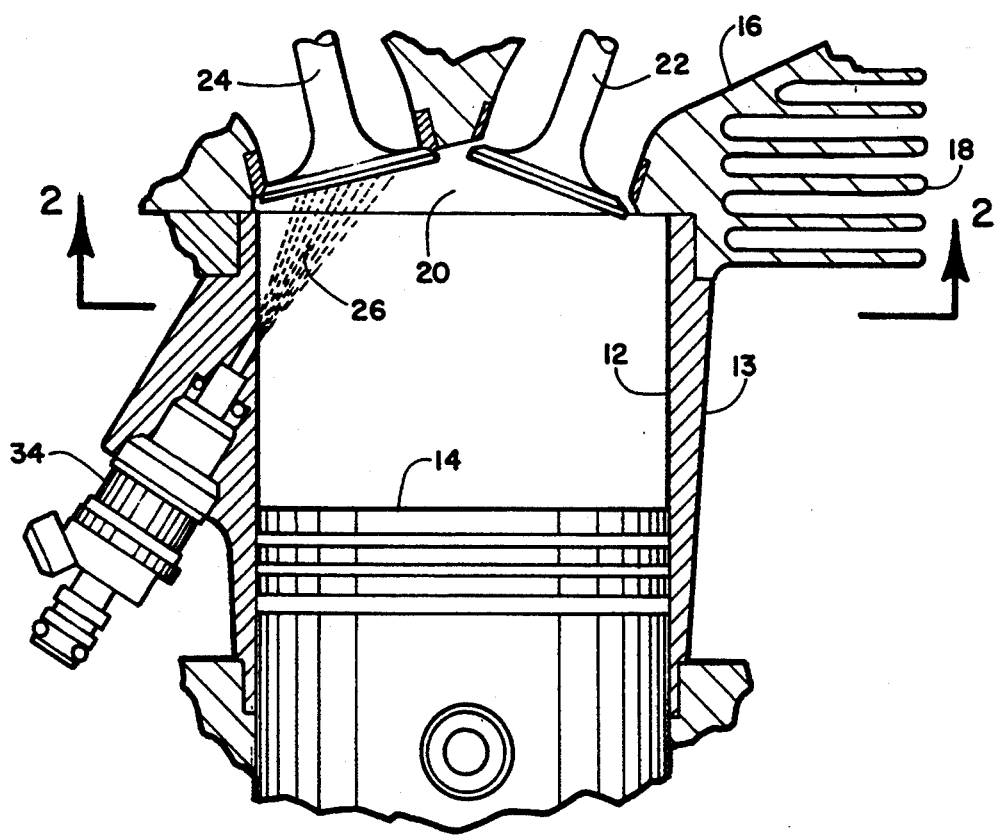
FIG. 2 is a schematic transverse vertical section view of an alternate embodiment having the injector on the same side as the exhaust valve.

FIGS. 1 and 2 are schematic illustrations of a conventional internal combustion engine 10 in which the fuel injection system of this invention could be used. Any suitable engine, automotive, marine, aircraft, stationery, etc. may use the fuel injection improvement of this invention. FIG. 1 is a transverse section through one cylinder 12 in engine block 13 of engine 10, including components in the upper portion of the engine.

A conventional piston 14 is installed in cylinder 12 for reciprocation therealong. The top of cylinder 12 is closed by a cylinder head 16 having, in the embodiment shown, exterior cooling fins 18. A combustion chamber 20 is bounded by piston 14, head 16, intake valve 22 and exhaust valve 24. A conventional spark plug 32 is provided to ignite the air/fuel mixture in combustion chamber 20.

Fuel is introduced into cylinder 12 by a fuel injector 34 which is supplied with fuel by a conventional pumping and metering system under conventional computer control (not shown). Fuel injector 34 is mounted in an opening in engine block 13 in communication with cylinder 12. The assembly is shown in FIG. 1 during the intake stroke with exhaust valve 24 closed and intake valve 22 open. Preferably, fuel injector 34 is orientated so as to direct the spray 26 of fuel droplets toward the face of closed exhaust valve 24. This serves to both cool exhaust valve 24 and to aid in rapid vaporization of the fuel spray droplets approaching or contacting the surface of the exhaust valve or valves.

As the piston stroke continues, the piston moves up past fuel injector 34, intake valve 22 closes and the mixture of air and fuel is compressed into combustion chamber 20 and the power stroke begins. Typically the layout of valves and sparkplug may be as shown in FIG. 3, discussed below.

Any suitable fuel injector may be used as fuel injector 34. Since the fuel injector is not subjected to high temperature or pressure, a relatively low cost fuel injector may be used. Further, since the piston covers the fuel injector during combustion, much less fouling of the injector will occur. With better atomization of the fuel, more uniform air/fuel mixing and cooler exhaust valve/chamber temperatures, the system can use lower octane fuels without detonation and fewer objectional exhaust emissions will be produced. Exhaust valve 24, the exhaust seat and the valve guide will have a longer life due to cooler operation.

An alternate location for fuel injector 34 is shown in FIG. 2. Block 13, cylinder 12, intake valve 22 and exhaust valve 24, etc. are as shown in FIG. 1. In this embodiment, injector 34 is mounted in block 34 on the same side of cylinder 12 as exhaust valve and is positioned to direct fuel spray 26 toward exhaust valve 24.

Figure 3:
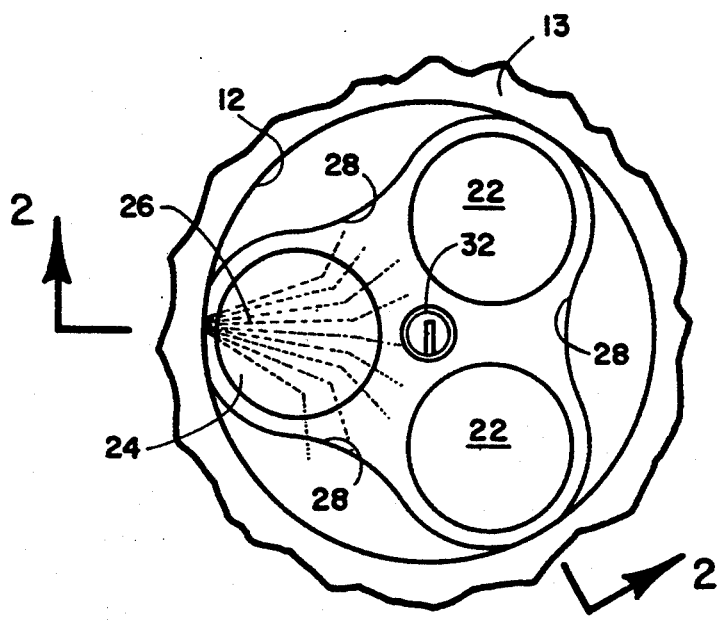
FIG. 3 is a section view taken on line 3—3 in FIG. 2.

As seen in FIG. 3, in the embodiment shown a single exhaust valve 24 and two intake valves 22 are used, with a centrally located spark plug 32. If desired, only a single intake valve of larger diameter could be used, and two or more exhaust valves could be used, with the injected fuel sprayed in the general direction of the exhaust valves. As seen in FIG. 3, head 16 may include squish pads 28 between valves 22 and 24 to cooperate with the upper surface of piston 14, as detailed in my copending applications identified above.

Figure 4:
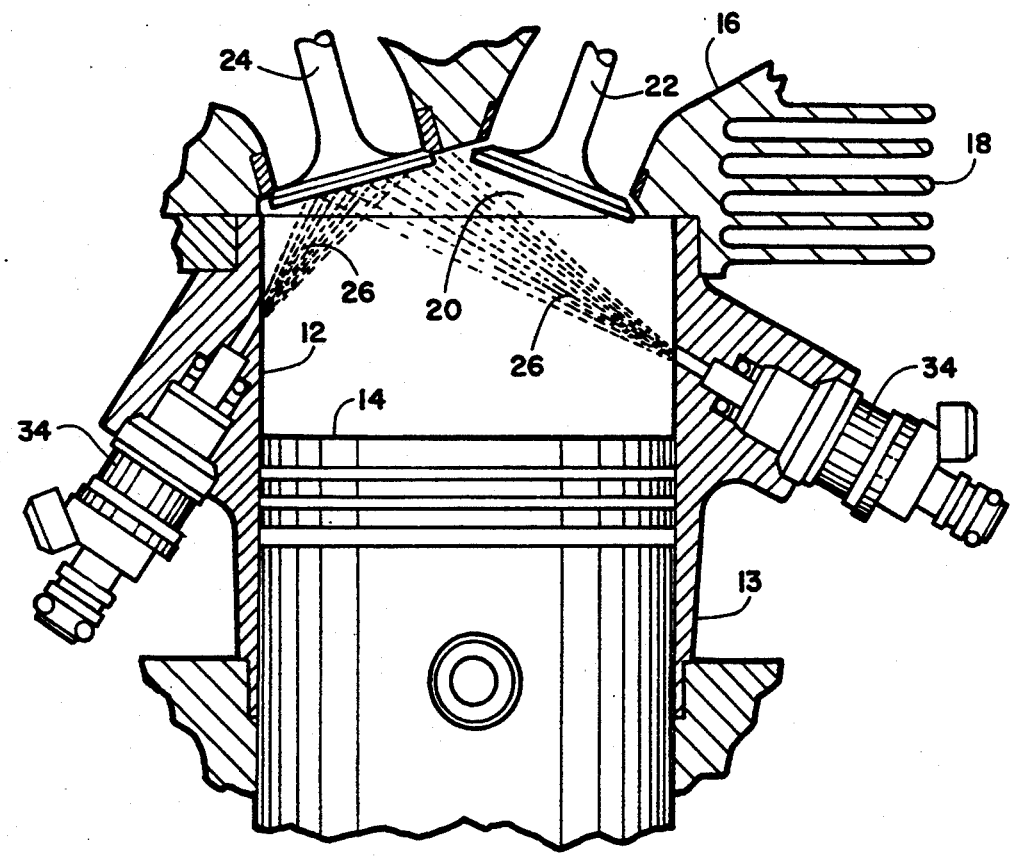
FIG. 4 is a schematic transverse vertical section view of a second alternate embodiment having two injectors on opposite sides of the cylinder.

A third embodiment of the fuel injection system of this invention is shown in FIG. 4. Here, the arrangement of block 13, cylinder 12, exhaust valve 24, intake valve 22 and combustion chamber 20, etc., is generally similar to that shown in FIG. 1. Here, two injectors 34 are provided on opposite sides of cylinder 12, each directing a fuel spray toward closed exhaust valve 24.

While the arrangements shown in the drawing are preferred, injectors 34 may be positioned and oriented differently, where suitable. For example, in some cases it may be preferred to orient at least one injector at an angle to the centerline of cylinder 12 to cause a swirling action. Where two exhaust valves 24 are provided, each of the injectors 34 could be oriented to direct fuel against one of the exhaust valves. Of the embodiments shown, that of FIG. 2 is preferred because the fuel spray directly contacts the hot exhaust valve, vaporizes and is then entrained in the intake airflow.

While certain preferred materials, dimensions and arrangements have been detailed in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. An improved system for injecting fuel into a cylinder of an internal combustion engine which comprises;
   at least one cylinder with a piston therein for reciprocation in the cylinder;
   a cylinder head opposite the top of the piston;
   a combustion chamber between said piston and said head;
   at least one exhaust valve and at least one intake valve in said cylinder head;
   at least one fuel injector mounted adjacent to the side wall of said cylinder and located to inject substantially all injected fuel into said cylinder toward said exhaust valve; and
   means for causing fuel to be injected during the intake period of said engine while the top of said piston is below said fuel injector.

2. The system according to claim 1 including a single exhaust valve, a single intake valve and a single fuel injector.

3. The system according to claim 2 wherein said injector is on the side of said cylinder opposite said exhaust valve.

4. The system according to claim 2 wherein said injector is on the same side of said cylinder as said exhaust valve.

5. The system according to claim 1 wherein at least two injectors are provided in said cylinder with said injectors oriented to inject fuel toward at least one exhaust valve.

6. In an internal combustion engine comprising an engine block, at least one cylinder in said block, a piston in said cylinder for reciprocation therealong, a cylinder head opposite an end surface of said piston forming a combustion chamber between said head and said piston, at least one exhaust valve and at least one intake valve in said head operatively connected to said combustion chamber, means for introducing fuel into the space between cylinder head and piston and means for igniting a mixture of air and fuel in said combustion chamber, the improvement wherein:

said means for introducing fuel into said space between cylinder head and piston comprises a fuel injector mounted in the sidewall of said cylinder and located to direct a spray of injected fuel into said cylinder toward said exhaust valve through a flush opening in said side wall located so as to be covered by said piston during fuel combustion.

7. The improvement according to claim 6 wherein each cylinder has a single exhaust valve, a single intake valve and a single fuel injector.

8. The improvement according to claim 7 wherein said injector is on the side of said cylinder opposite said exhaust valve.

9. The improvement according to claim 7 wherein said injector is on the same side of said cylinder as said exhaust valve.

10. The improvement according to claim 6 wherein at least two injectors are provided in each of said cylinders with said injectors oriented to inject fuel toward at least one exhaust valve.

11. The method of operating an internal combustion engine having a piston movable in a cylinder, a head closing an end of the cylinder opposite the top of said piston and forming a combustion chamber therebetween, intake and exhaust valves communicating with said combustion chamber, means for introducing fuel into said combustion chamber and means for igniting a mixture of air and fuel in said combustion chamber, comprising the steps of:

injecting a spray of fuel into said cylinder through the sidewall of said cylinder while the top of said piston is below the injection site;

maintaining the exhaust valve closed during the injection period;

substantially all of said fuel spray being directed against said exhaust valve:

moving said piston upwardly to cover said injection site and compress the fuel and air into said combustion chamber; and igniting the compressed fuel and air mixture.

12. The method according to claim 11 wherein said fuel is injected through the sidewall opposite said exhaust valve.

13. The method according to claim 11 wherein said fuel is injected through the sidewall on the same side of the cylinder as said exhaust valve.

14. The method according to claim 11 wherein said fuel is injected simultaneously through the sidewall from opposite sides of said cylinder.

* * * * *